(12) United States Patent
Bargiacchi et al.

(10) Patent No.: US 9,981,352 B2
(45) Date of Patent: May 29, 2018

(54) MAINTENANCE TOOL AND METHOD FOR A SPLIT FRICTION BEARING ASSEMBLY AND ROTARY MACHINE USING THE SAME

(71) Applicant: Nuovo Pignone Srl, Florence (IT)

(72) Inventors: Massimo Bargiacchi, Florence (IT); Tommaso Breschi, Florence (IT); Leonardo Raugei, Florence (IT); Michele Bogazzi, Florence (IT)

(73) Assignee: Nuovo Pignone Srl, Florence (IT)

( * ) Notice: Subject to any disclaimer, the term of this patent is extended or adjusted under 35 U.S.C. 154(b) by 573 days.

(21) Appl. No.: 14/390,459

(22) PCT Filed: Apr. 2, 2013

(86) PCT No.: PCT/EP2013/056917
§ 371 (c)(1),
(2) Date: Oct. 3, 2014

(87) PCT Pub. No.: WO2013/150017
PCT Pub. Date: Oct. 10, 2013

(65) Prior Publication Data
US 2015/0040401 A1    Feb. 12, 2015

(30) Foreign Application Priority Data

Apr. 4, 2012    (IT) .............................. CO2012A0013

(51) Int. Cl.
*B23Q 1/64* (2006.01)
*B23P 15/00* (2006.01)
(Continued)

(52) U.S. Cl.
CPC ............ *B23P 15/003* (2013.01); *B25B 27/06* (2013.01); *F16C 17/022* (2013.01);
(Continued)

(58) Field of Classification Search
USPC ................. 269/55, 57, 58; 29/281.5, 898.07, 29/898.08; 81/52, 484
See application file for complete search history.

(56) References Cited

U.S. PATENT DOCUMENTS 1,872,600 A    8/1932    Manning
2,639,498 A  *  5/1953    Rookstool ............... B25B 27/06
                                                     29/270
(Continued)

FOREIGN PATENT DOCUMENTS

CN    2411838 Y    12/2000
CN    2412006 Y    12/2000
(Continued)

OTHER PUBLICATIONS

Unofficial English Translation of Japanese Search Report issued in connection with corresponding JP Application No. 2015503857 dated Jan. 16, 2017.
(Continued)

*Primary Examiner* — Joseph J Hail
*Assistant Examiner* — Shantese McDonald
(74) *Attorney, Agent, or Firm* — GE Global Patent Operation

(57) ABSTRACT

The tool is designed to carried out maintenance operations on a bearing assembly comprising a bushing split into at least two shells; the maintenance tool comprises a device arranged to act on and rotate the bushing shells. In particular, the device comprises a slide and a pin; the slide has a hole transversal to its sliding direction and the pin is slidably mounted inside the hole and protrudes from the hole; in a first operating position the pin acts on a shell and in a second operating position the pin does not act on any shell. The method provides to rotate the bushing shells without rotating the supported shaft, and to carry out maintenance operations (Continued)

on a shell at a time while leaving the shaft supported by the other shell.

15 Claims, 13 Drawing Sheets

(51) Int. Cl.
*B25B 27/06* (2006.01)
*F16C 35/02* (2006.01)
*F16C 17/02* (2006.01)
*F16C 33/04* (2006.01)
*F16C 33/08* (2006.01)

(52) U.S. Cl.
CPC ............ *F16C 33/046* (2013.01); *F16C 33/08* (2013.01); *F16C 35/02* (2013.01); *Y10T 29/49638* (2015.01); *Y10T 29/53104* (2015.01)

(56) References Cited

U.S. PATENT DOCUMENTS

| | | | |
|---|---|---|---|
| 2,800,708 | A | 7/1957 | Coleman |
| 3,413,709 | A | 12/1968 | Scobel et al. |
| 3,722,057 | A | 3/1973 | Barnes |
| 3,886,644 | A * | 6/1975 | Koch, Jr. ............ B25B 27/0035 29/256 |
| 4,233,864 | A | 11/1980 | Gutierrez, Jr. |
| 4,662,050 | A * | 5/1987 | Bryce ................ B25B 27/0028 29/281.5 |
| 5,697,878 | A | 12/1997 | Elkis |
| 5,928,286 | A | 7/1999 | Ashby et al. |
| 6,470,846 | B1 | 10/2002 | Kammeraad et al. |
| 2010/0166347 | A1 | 7/2010 | Wendling |

FOREIGN PATENT DOCUMENTS

| | | |
|---|---|---|
| CN | 2412027 Y | 12/2000 |
| DE | 1211025 B | 2/1966 |
| DE | 1627716 A1 | 8/1970 |
| DE | 19617599 C1 | 10/1997 |
| GB | 1143303 A | 2/1969 |
| JP | 3826003 B | 3/1962 |
| JP | 4326451 B | 11/1968 |
| JP | 04164532 A | 6/1992 |
| SU | 32405 A1 | 9/1933 |
| SU | 712548 A1 | 1/1980 |
| SU | 1549711 A1 | 3/1990 |

OTHER PUBLICATIONS

Unofficial English Translation of Japanese Office Action issued in connection with corresponding JP Application No. 2015503857 dated Feb. 7, 2017.
Unofficial English Translation of Russian Office Action and Search Report issued in connection with corresponding RU Application No. 2014138616 dated Feb. 10, 2017.
Unofficial English Translation of Chinese Office Action issued in connection with corresponding CN Application No. 201380018769.X dated Jul. 21, 2015.
Search Report and Written Opinion issued in connection with corresponding IT Application No. CO2012A000013 dated Nov. 27, 2012.
International Search Report and Written Opinion issued in connection with corresponding PCT Application No. PCT/EP2013/056917 dated Aug. 16, 2013.

\* cited by examiner

MAINTENANCE TOOL AND METHOD FOR A SPLIT FRICTION BEARING ASSEMBLY AND ROTARY MACHINE USING THE SAME

BACKGROUND

Embodiments of the subject matter disclosed herein generally relate to a maintenance tool and a maintenance method for a split friction bearing assembly, as well as a rotary machine using the same.

In the field of "Oil & Gas" (i.e. the industrial field comprising industries involved in finding, producing, processing, transporting and distributing oil and natural gas), different kinds of machines, such as reciprocating compressors, are used comprising one or more rotatable shafts that rotate when the machine is operating.

A rotatable shaft is usually supported by at least two bearing assemblies and the bearing assemblies are fixed to the frame of the machine.

There are different kinds of bearings.

Embodiments of the subject matter disclosed herein relate to friction bearings, more specifically to "split friction bearings", i.e. friction bearings wherein their bushing is split into at least two shells; it is quite common that the shells are only two in order to avoid complications of construction of the bearing.

A split friction bearing is known e.g. from US 2010/0166347 A1.

Due to the operation of the machine, more specifically to the rotation of its shaft, the shells of a split friction bearing are subject to wear and/or fouling.

Therefore, maintenance operations are carried out on the bearing, more specifically on its shells.

From U.S. Pat. No. 6,470,846 B1, there is known a broach tool is for use in repairing a camshaft support bearing for operably supporting a camshaft in an internal combustion engine. The engine includes a cylinder head with bearing support towers that operably support journals on the camshaft at multiple aligned bearing locations. A broaching tool is provided that is adapted to be linearly pulled through the aligned bearing locations to reform the bearing support structures. Methods of repair include enlarging at least one camshaft support bearing to an oversized condition, such as by using the broach, optionally repairing the oversized camshaft support bearing by filling voids and galled areas with a thermal setting polymer, as needed, and optionally positioning a bearing insert on the camshaft, and positioning the camshaft including the bearing insert in the camshaft support bearing with the camshaft being rotatably supported in the bearing insert and the bearing insert being secured to the oversized camshaft support bearing.

Therefore, there is a general need for a solution that permits maintenance of the bushing shells of a split friction bearing without disassembling the machine and/or its components.

More particularly, there is a need for a solution that permits maintenance of the bushing shells of a split friction bearing without translating and/or rotating the shaft of the machine supported by the bearing.

BRIEF SUMMARY OF THE INVENTION

A first aspect of the present invention is a maintenance tool for a bearing assembly.

According to embodiments thereof, a maintenance tool for a bearing assembly, wherein the bearing assembly comprises a bushing split into at least two shells, comprises a device arranged to act on and rotate a shell of said at least two shells.

Some features and variants are set out in the following.

Said device is typically arranged to act on one shell of said bearing assembly and to rotate all shells of said bearing assembly.

Said device may comprise a slide and a pin; said slide has a hole transversal to its sliding direction; said pin is slidably mounted inside said hole and protrudes from said hole; in a first operating position said pin acts on said shell and in a second operating position said pin does not act on said shell.

Said pin may be slid manually.

Said hole may be threaded and said pin may be slid by screwing and unscrewing it.

Said bearing assembly may comprise a bearing housing split into a first housing part and a second housing part; said first housing part and said second housing part are releasably fixable together; in this case, the maintenance tool may comprise a tool housing releasably fixable to said second housing part of said bearing assembly.

Said first housing part may be semi-cylindrical, said tool housing may be semi-cylindrical, and each shell may be semi-cylindrical.

The maintenance tool may comprise further a tool housing; said device may comprise a slide; said tool housing may have a guide being arc-shaped; said slide is arranged to slide back and forth along said guide.

A second aspect of the present invention is a method for maintenance of shells of a bushing of a bearing assembly.

According to embodiments thereof, a method for maintenance of shells of a bushing of a bearing assembly, wherein said bearing assembly is associated to a stationary rotatable shaft a machine, wherein said bearing assembly is provided with an opening having a size equal to or greater than any one of said shells, comprises the steps of: A) rotating said shells till when a shell is in a position corresponding to said opening, B) extracting said shell from said bearing assembly, C) carrying out a maintenance operation on said shell, and D) inserting said shell into said bearing assembly.

Some features and variants are set out in the following.

The method may comprise further the steps of: E) rotating said shells till when another shell is in a position corresponding to said opening, F) extracting said another shell from said bearing assembly, G) carrying out a maintenance operation on said another shell, and H) inserting said another shell into said bearing assembly.

Said shells may be semi-cylindrical.

Said opening may be normally closed; in this case, before extracting a shell, said opening is opened and after inserting a shell said opening is closed.

Rotation of said shells may be carried out while said opening is closed.

Rotation of said shells is, in an embodiment, carried out while said shaft is stopped.

Said shells may be rotated by acting on one or more lubrication holes of one or more of said shells.

Said shells may be rotated through a plurality of rotation operations.

Said bearing assembly may be provided with a bearing housing split into a first housing part and a second housing part; said first housing part and said second housing part being releasably fixable together. In this case, a maintenance tool may be used for rotating said shells; said tool comprises a tool housing, said tool housing being arranged to be releasably fixed to said second housing part.

Said maintenance tool may be mounted to said second housing part before step A and may be dismounted from said second housing part after step D.

Said maintenance tool may be dismounted from said second housing part after step H.

Said maintenance tool may be dismounted from said second housing part after rotating said shells till an operating position.

The tool and/or the method set out above may, in an embodiment, be used for a rotary machine, i.e. a machine comprising a rotatable shaft supported by at least two bearing assemblies.

Such a machine may be provided with an own specific maintenance tool to be used only during maintenance operations by the maintenance personnel; in this case, the tool is a sort of "accessory".

In an embodiment, the same tool is suitable for being used for more than one bearing assembly of the same machine.

It is possible that a single machine be provided with a set of own specific maintenance tools for different kinds (for example different sizes) of bearing assemblies.

BRIEF DESCRIPTION OF THE DRAWINGS

The accompanying drawings, which are incorporated herein and constitute a part of the specification, illustrate embodiments of the present invention and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In a rotary machine, there is a rotatable shaft supported by at least two bearing assemblies.

In the following, it is assumed that both these bearings are "split friction bearings".

During operation of this machine, its shaft rotates while these supporting bearing assemblies, in particular the shells of its bushings, are stationary.

Figure 1:
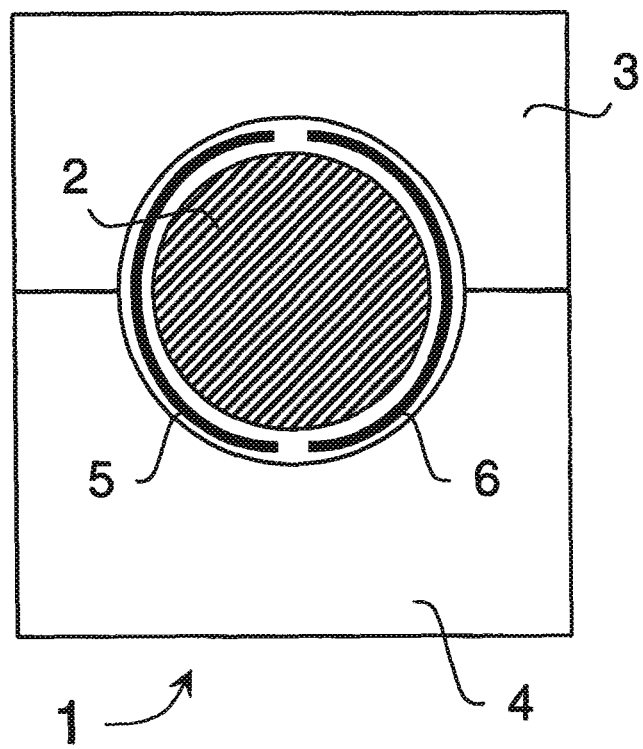
FIGS. 01, 02, 03, 04, 05, 06, 07, 08, 09, 10, 11, 12, 13, 14, 15, 16, 17, and 18 show, very schematically, the transversal cross-section of an embodiment of a split bearing assembly according to the present invention in different conditions.

FIG. 01 shows, in a very schematic way, a transversal cross-section of an embodiment of a friction bearing assembly 1 associated to the rotatable shaft 2 of the machine.

The bearing assembly 1 comprises a bearing housing split into an upper housing part 3 and a lower housing part 4; the upper and lower housing parts 3 and 4 are fixed together in a releasable way, for example by means of screws or bolts (not shown in FIG. 01); the bearing housing contains a bushing that surrounds the shaft 2; the bushing is split into two semi-cylindrical shells 5 and 6 that provide internally the bearing surface (split into semi-cylindrical surface) for the rotating shaft 2; in the embodiment of FIG. 01, the two housing parts have two semi-cylindrical seats for receiving and compressing the shells 5 and 6 against the shaft 2.

It is to be noted that a lubrication fluid is present inside the bearing, in particular between the shells 5 and 6 and the shaft 2; the lubrication fluid is appropriately circulated within the bearing; this is known in the field of "Oil & Gas".

According to this embodiment, as shown in FIG. 01, the two shells 5 and 6 are positioned transversely with respect to the housing parts 3 and 4; specifically, the housing parts 3 and 4 are positioned horizontally (i.e. the dividing plane is horizontal) and the bushing shells 5 and 6 are positioned vertically (i.e. the dividing plane is vertical).

During operation of the machine, the housing parts 3 and 4 and the bushing shells 5 and 6 are stationary, while the shaft rotates.

In order to carry out maintenance operations on the bushing shells 5 and 6, the machine is stopped; but the machine and/or its components are not disassembled; in particular the shaft 2 may remain in the position taken after stopping the machine.

In order to carry out maintenance operations on the bushing shells 5 and 6, a maintenance tool is used comprising a device arranged to act on and rotate the shells 5 and 6. In the FIGS. from 01 to 18, this device is very schematically shown and associated to reference number 8; these figures show the device as a simple pin that can slide radially and can rotate about the axis of the shaft 2; this rotation is realized by sliding the pin 8 circularly along a tool housing 7 while keeping the pin 8 radially arranged; the tool housing 7 is fixable to the lower housing part 4 in a releasable way, for example by means of screws or bolts.

FIGS. from 20 to 22 show the device of the maintenance tool in greater details, in particular as a combination of a slide and a pin (that is used as a dowel).

Figure 2:
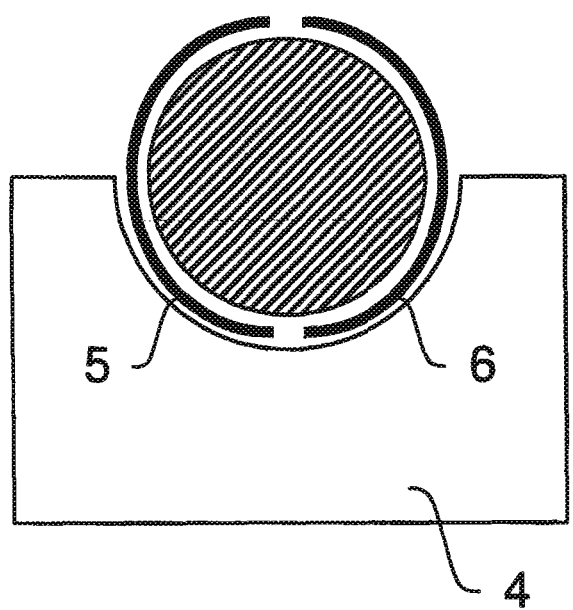

The bearing assembly 1 of FIG. 01 can be opened by dismounting the upper housing part 3 from the lower housing part 4 (as shown in FIG. 02); therefore, it may said that the bearing assembly 1 is provided with an opening having a size (approximately) equal to any one of the shells 5 and 6; extraction of a shell from the bearing assembly may be obtained by a radial (or almost radial) displacement when the shell is (substantially) aligned with the opening.

Figure 3:
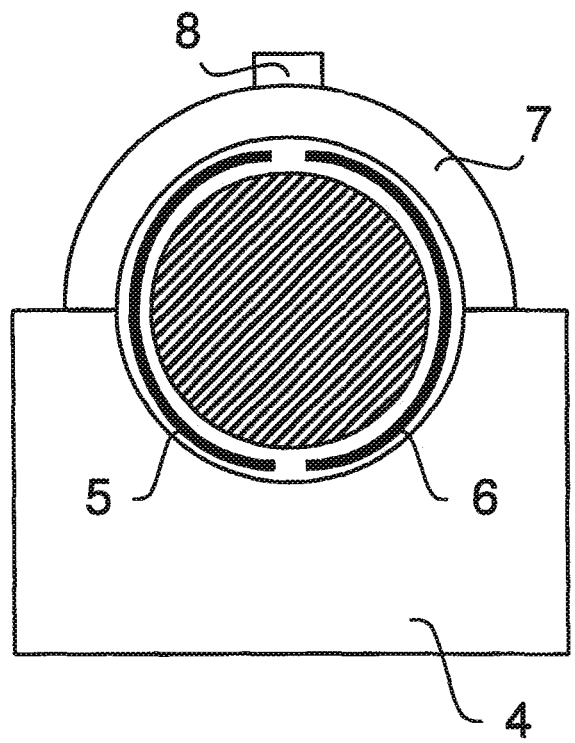
Figure 5:
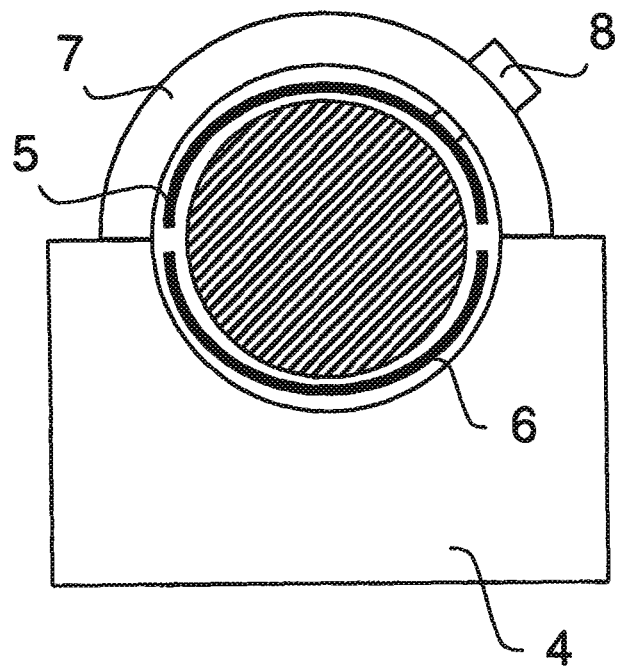
Figure 6:
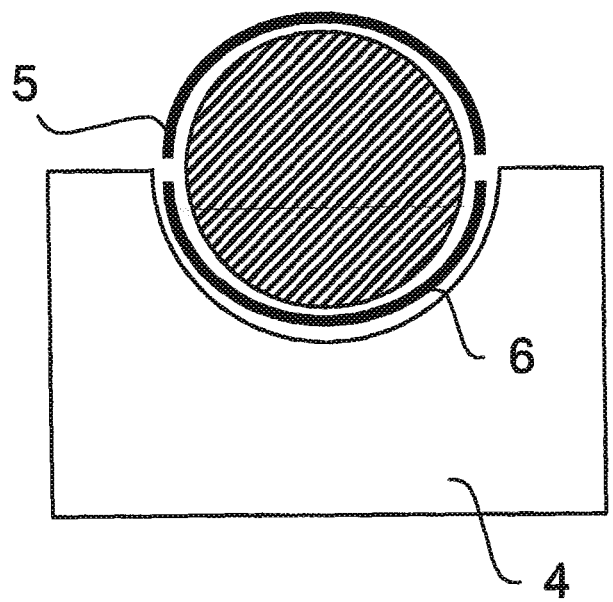
Figure 7:
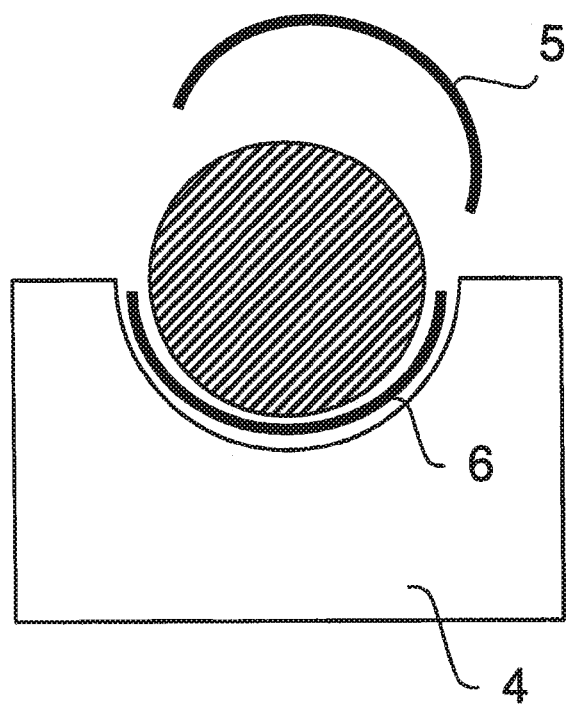
Figure 12:
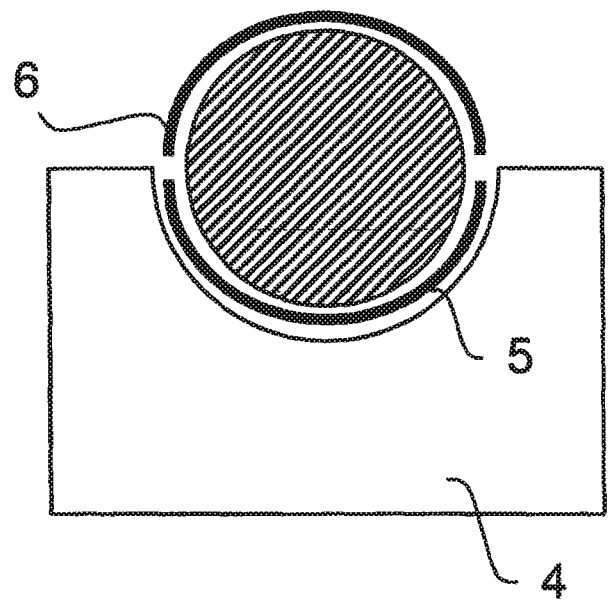
Figure 13:
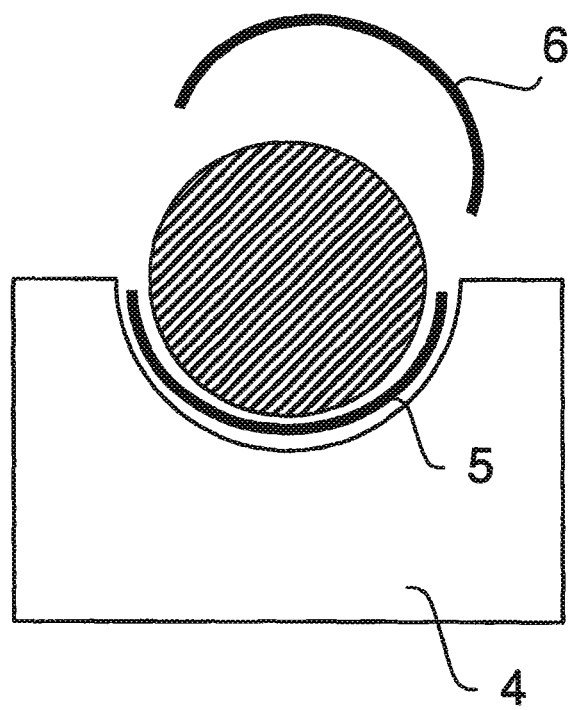
Figure 15:
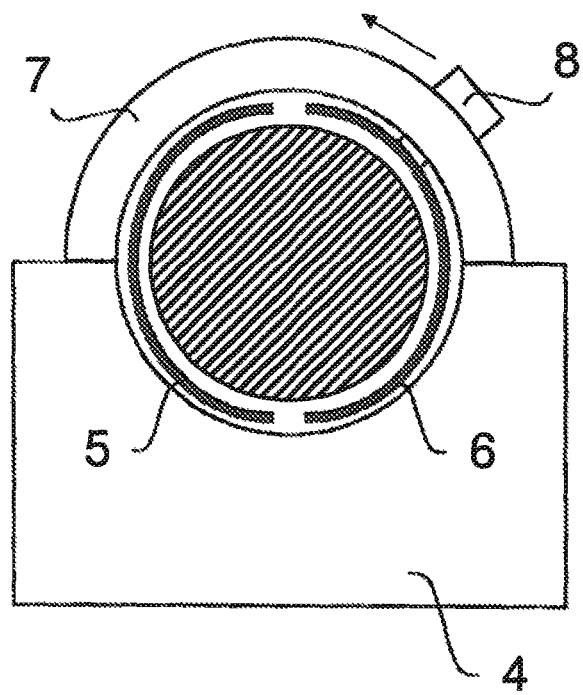
Figure 16:
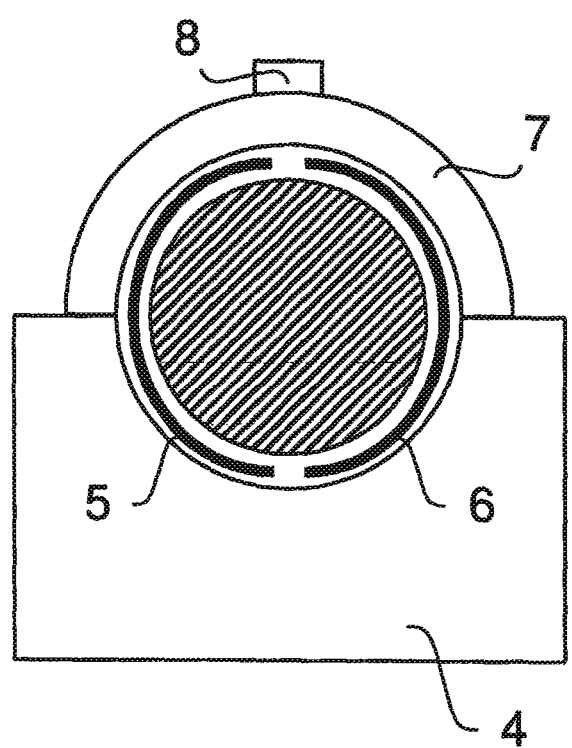
Figure 17:
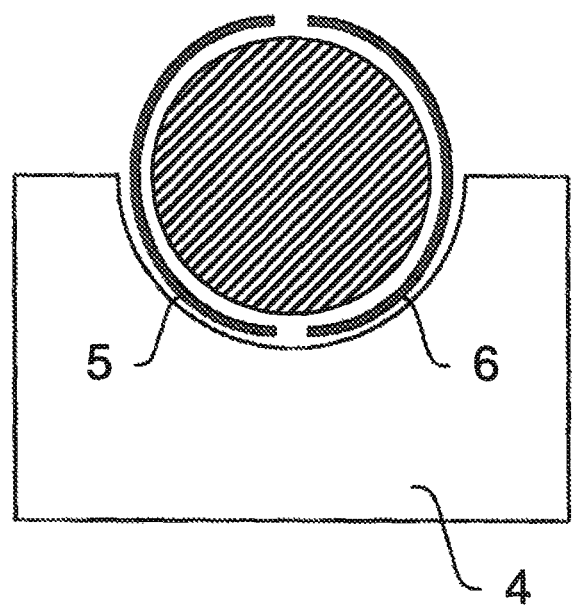

With reference to the FIGS. from 01 to 18 relating to the bearing assembly and to FIG. 19 relating a flow chart, maintenance of the bearing assembly may be carried out as follows: dismounting the upper housing part 3 from the lower housing part 4 (step 1901), see FIG. 02; mounting the maintenance tool 7 and 8 to the lower housing part 4 (step 1902), see FIG. 03; rotating (clockwise) the shell 5 (and consequently also the shell 6) till when the shell 5 is in a position corresponding to said opening (step 1903), see FIG. 04 and FIG. 05; dismounting the maintenance tool 7 and 8 from the lower housing part 4 (step 1904), see FIG. 06; extracting the shell 5 from the bearing assembly (step 1905), see FIG. 07; carrying out a maintenance operation on the shell 5 (step 1906), for example cleaning or replacement; inserting the shell 5 into the bearing assembly (step 1907); mounting the maintenance tool 7 and 8 to the lower housing part 4 (step 1908, see FIG. 08; rotating (anticlockwise) said the shells 5 and 6 till when the shell 6 is in a position corresponding to said opening (steps 1909 and 1910), FIG. 08 and FIG. 09 and FIG. 10 and FIG. 11; dismounting the maintenance tool 7 and 8 from the lower housing part 4 (step 1911), see FIG. 012; extracting the shell 6 from the bearing assembly (step 1912), see FIG. 13; carrying out a maintenance operation on the shell 7 (step 1913), for example cleaning or replacement; inserting the shell 6 into the bearing assembly (step 1914); mounting the maintenance tool 7 and 8 to the lower housing part 4 (step 1915), see FIG. 14; rotating (clockwise) the shell 6 (and consequently also the shell 5) till when the shells 5 and 6 are in an operating position of the bearing assembly (step 1916), see FIG. 14 and FIG. 15; dismounting the maintenance tool 7 and 8 from the lower housing part 4 (step 1917), see FIG. 16 and FIG. 17; mounting the upper housing part 3 to the lower housing part 4 (step 1918), see FIG. 18 corresponding exactly to FIG. 01.

In summary, such method provides to rotate the bushing shells without rotating the supported shaft, and to carry out maintenance operations on a shell at a time while leaving the shaft supported by the other shell or shells.

Figure 18:
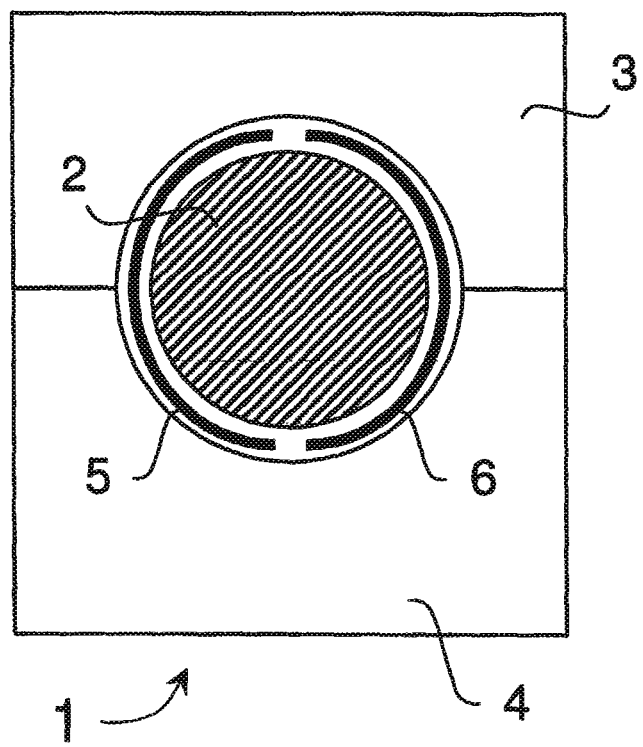
Figure 19:
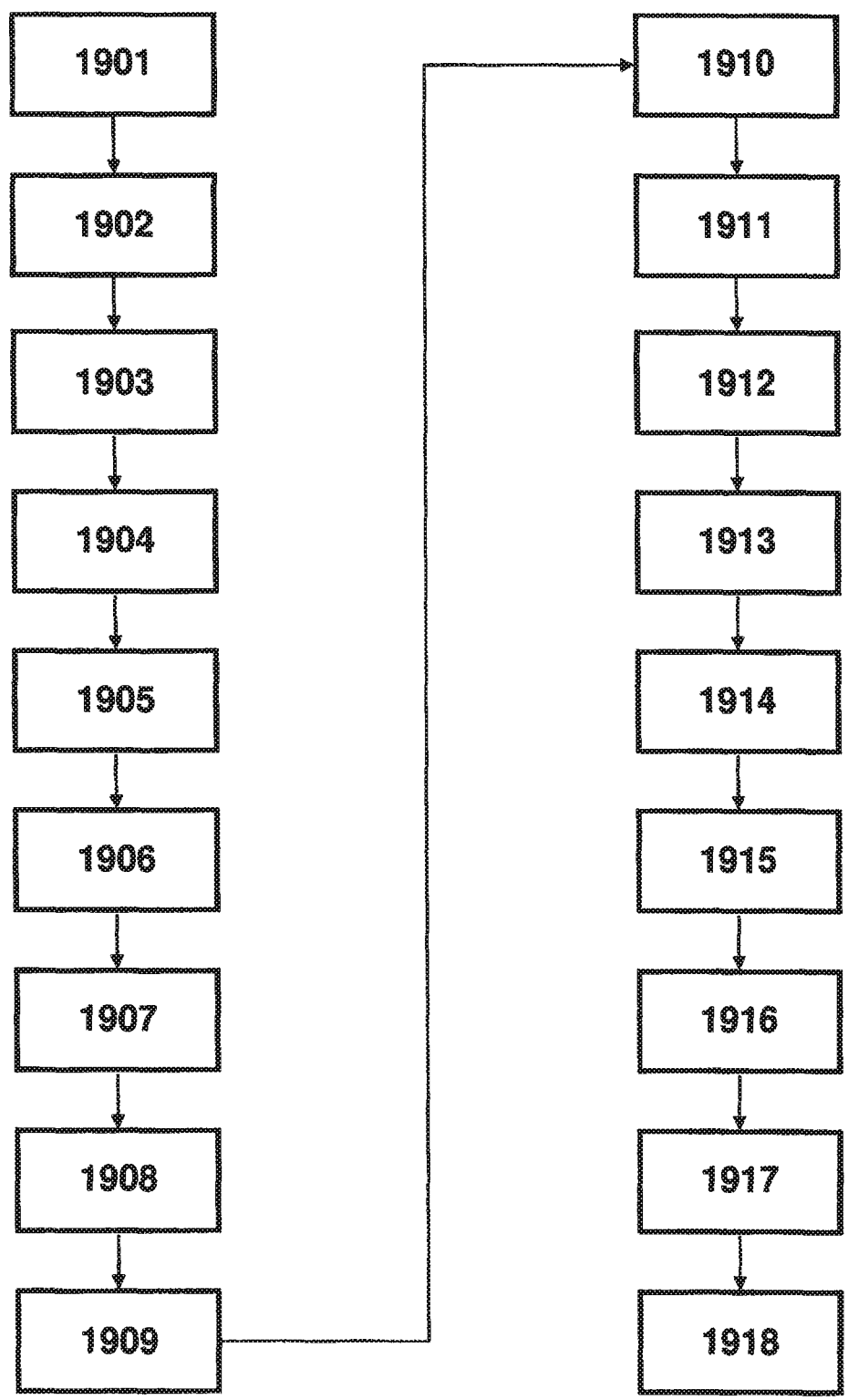
FIG. 19 is a flow chart relating to an embodiment of a maintenance method corresponding to figures from 01 to 18.

With reference to the figures from 01 to 18, it is to be noted: that in a first operating position the pin 8 acts on a shell (see e.g. FIG. 04 and FIG. 05) and in a second operating position the pin 8 does not act on a shell (see e.g. FIG. 02); that rotation of one of the shells causes rotation of the other of the shells as their edges get in contact; in any condition of the bearing assembly from the initial condition of FIG. 01 to the final condition of FIG. 18, the shaft of the machine is supported by one shell or both shells of the bushing; the rotation of the shells is obtained by acting manually externally to the housing, in particular the tool housing.

Figure 8:
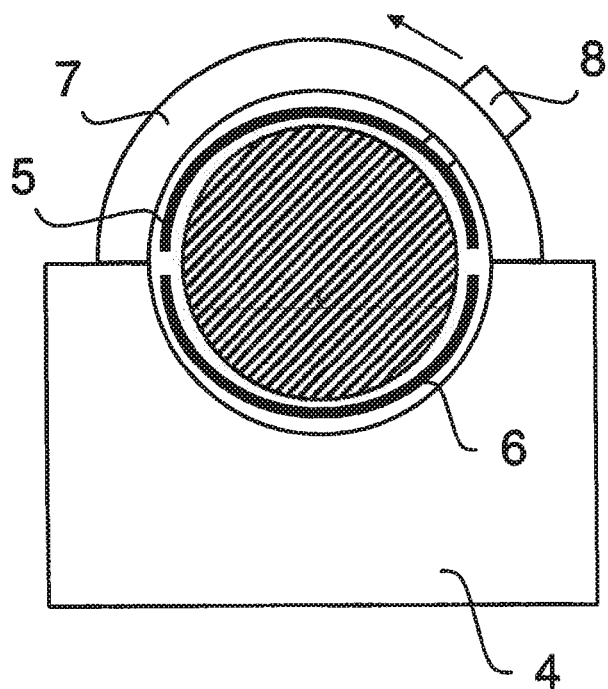
Figure 9:
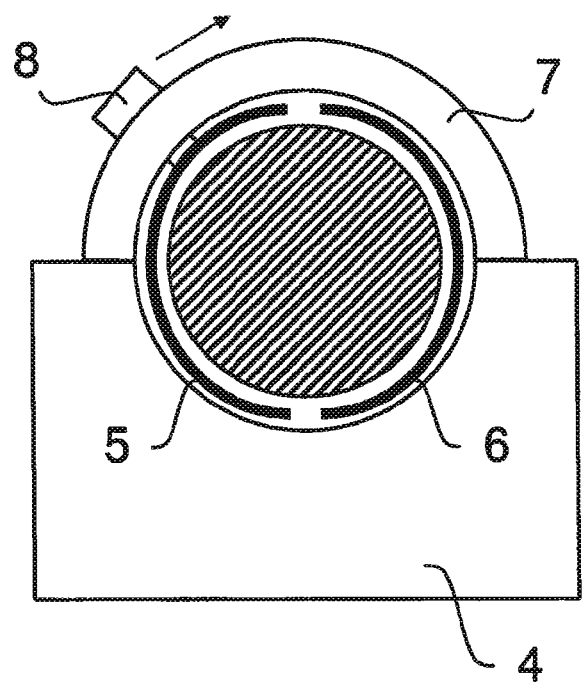
Figure 10:
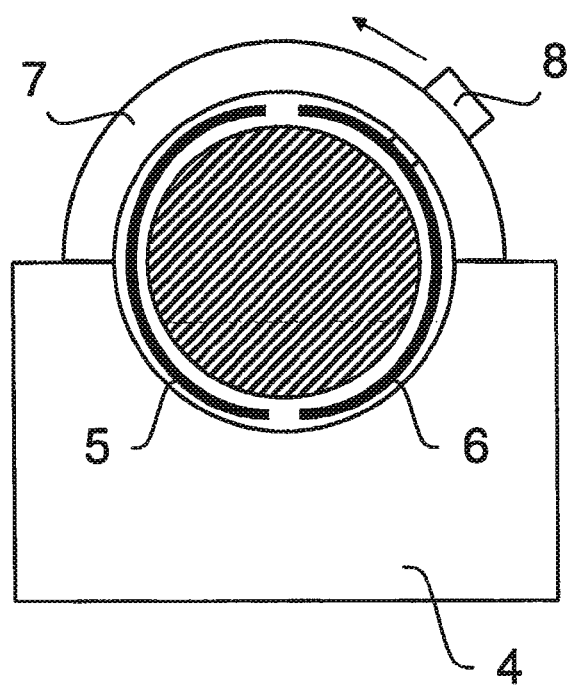
Figure 11:
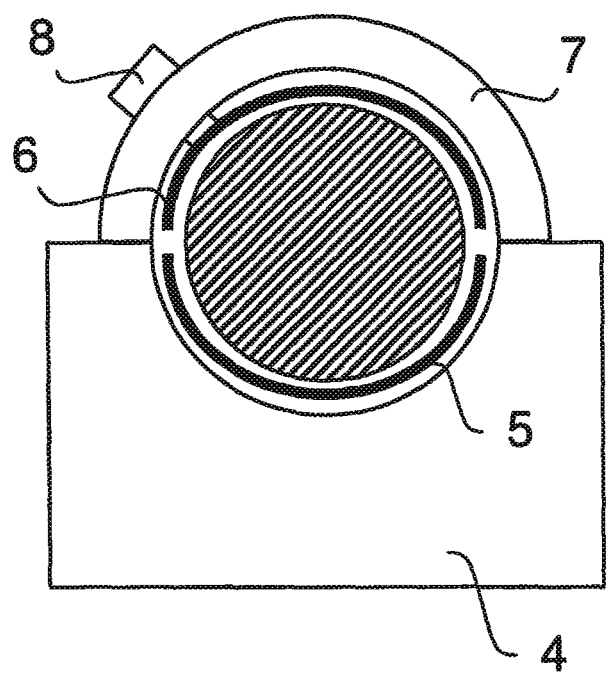

With reference to the FIGS. from 08 to 11, it is to be noted that such rotation is carried out in two steps, namely step 1909 and step 1910: rotating (anticlockwise) the shell 5 (and consequently also the shell 6) by 90° (step 1909), compare FIG. 08 and FIG. 09, and rotating (anticlockwise) the shell 6 (and consequently also the shell 5) by 90° (step 1910), compare FIG. 10 and FIG. 11; between these two rotations of the shells, there is a (clockwise) rotation of the pin 8 by 90°, compare FIG. 09 and FIG. 10, during which the pin 8 does not act on any of the shells 5 and 6.

Due to the pressure exerted by the housing parts of the bearing assembly on the bushing shells and thanks to the lubrication fluid in the gap between the bushing shells and the journal, the bushing shells do not rotate even when the shaft of the machine rotates.

When the shaft is stationary, the bushing shells are compressed between the journal and the housing parts, specifically the seats of the housing parts; to this regard, it is to be noted that even if in the FIGS. from 01 to 18 the edges of the shells appear distant from each other they are indeed quite close in reality.

In order to facilitate the rotation of the bushing shells by the device of the maintenance tool, an embodiment provides a tool housing wherein the seat for the bushing shells is quite deep, i.e. deeper than the seat of the housing part of the bearing assembly; in other words, there is more room for housing the bushing shells.

Furthermore, in case of a deep seat, when a shell arrives in a position corresponding to the opening of the bearing assembly (see e.g. FIG. 05 and FIG. 06, FIG. 11 and FIG. 12), the shell tends to get out of the bearing assembly; therefore, extraction is easier.

Figure 14:
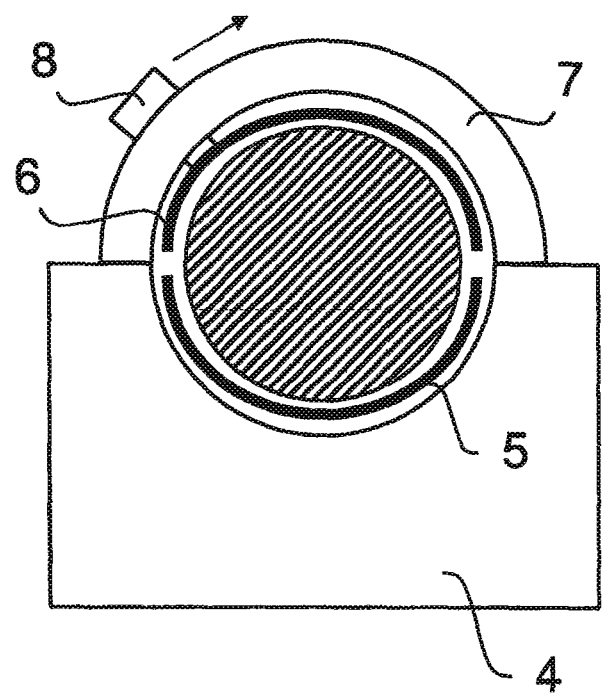

Anyway, in case of a deep seat, it is more difficult to insert again a shell into the bearing assembly, i.e. performing the initial part of the rotation of the shell starting from e.g. the position shown in FIG. 08 or FIG. 14. In order to overcome this problem, the seat of the tool housing may be internally provided with two devices (not shown in the figures) for guiding a shell into the smaller seat of the housing part of the bearing assembly.

As already explained, the device of the maintenance tool acts on and rotates one of the bushing shells; alternative embodiments may provide that the device acts on and rotate more than one bushing shell.

A very effective way of achieving this result (even if not the only one) is by using a pin that can cooperate with lubrication holes of the bushing shells; in this way, no design change is necessary for the shells; split friction bearings having radial lubrication holes are known for example from US 2010/0166347 A1.

By sliding the pin radially, it is inserted into the hole of the bushing shell; then, by rotating the pin about the axis of the shaft (that corresponds to the axis of the bushing), the bushing shell is rotated (in this way the pin is used as a dowel); by sliding back the pin radially, it is extracted from the bushing shell and the bushing shell is freed.

According to typical applications of the present invention, the maintenance tool is designed to cooperate with a cylindrical bushing having diameter in the range from 100 mm to 450 mm, length in the range from 80 mm to 250 mm, width in the range from 5 mm to 15 mm, lubrication holes in the range from 15 mm to 40 mm and in a number from 4 to 16; in case of semi-cylindrical shells, the number of lubrication holes is typically in the range from 2 to 7.

Figure 20:
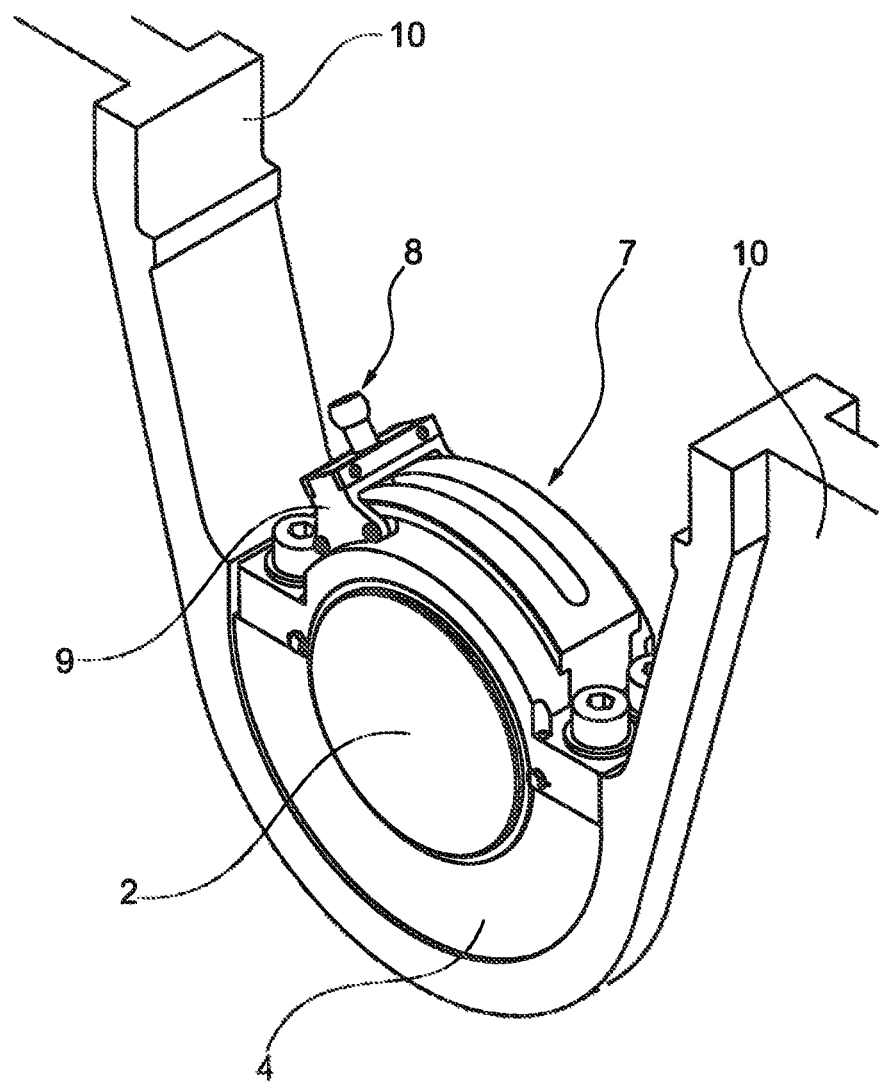
FIG. 20 shows a perspective view of another embodiment of a split bearing assembly according to the present invention.

FIG. 20 shows partially a frame 10 of a machine and a bearing assembly 1 fixed to the frame 10 and supporting a rotatable shaft 2 of the machine; to be precise, FIG. 20 shows on the journal of the shaft of the machine.

Figure 21:
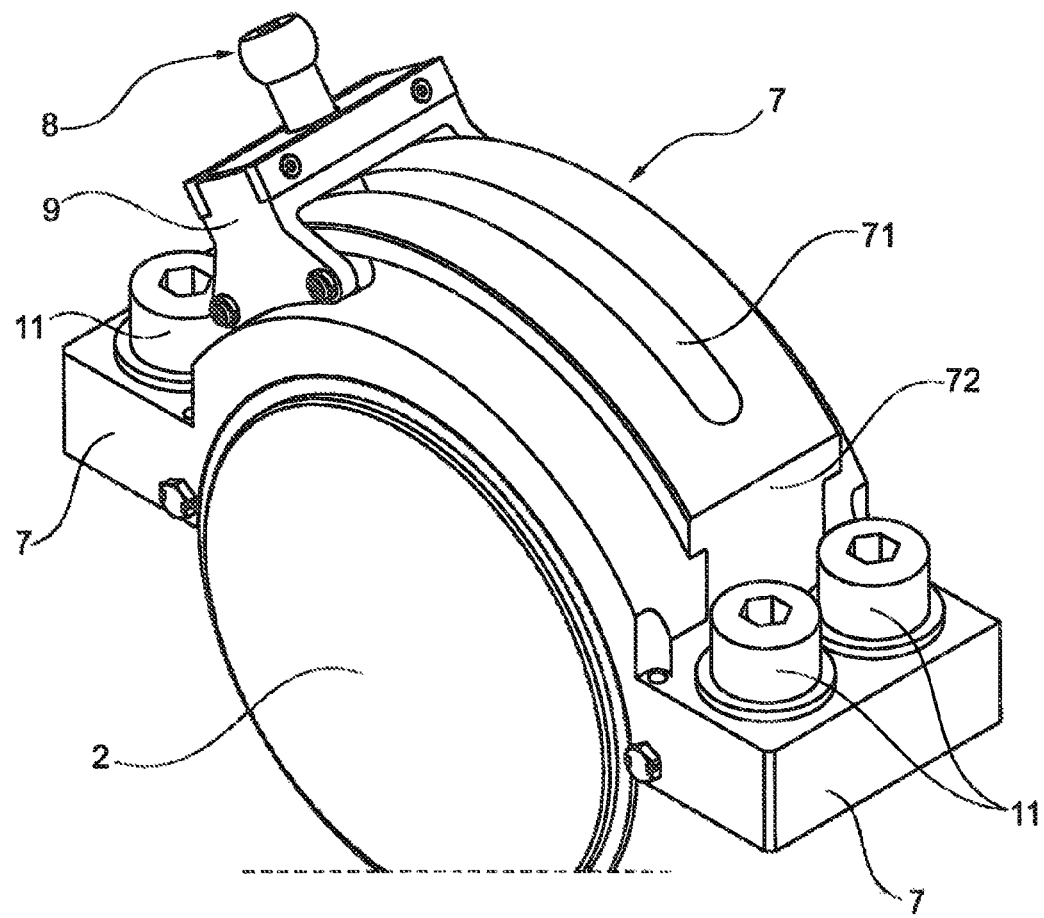
FIG. 21 shows an enlarged detail of FIG. 19.
Figure 22:
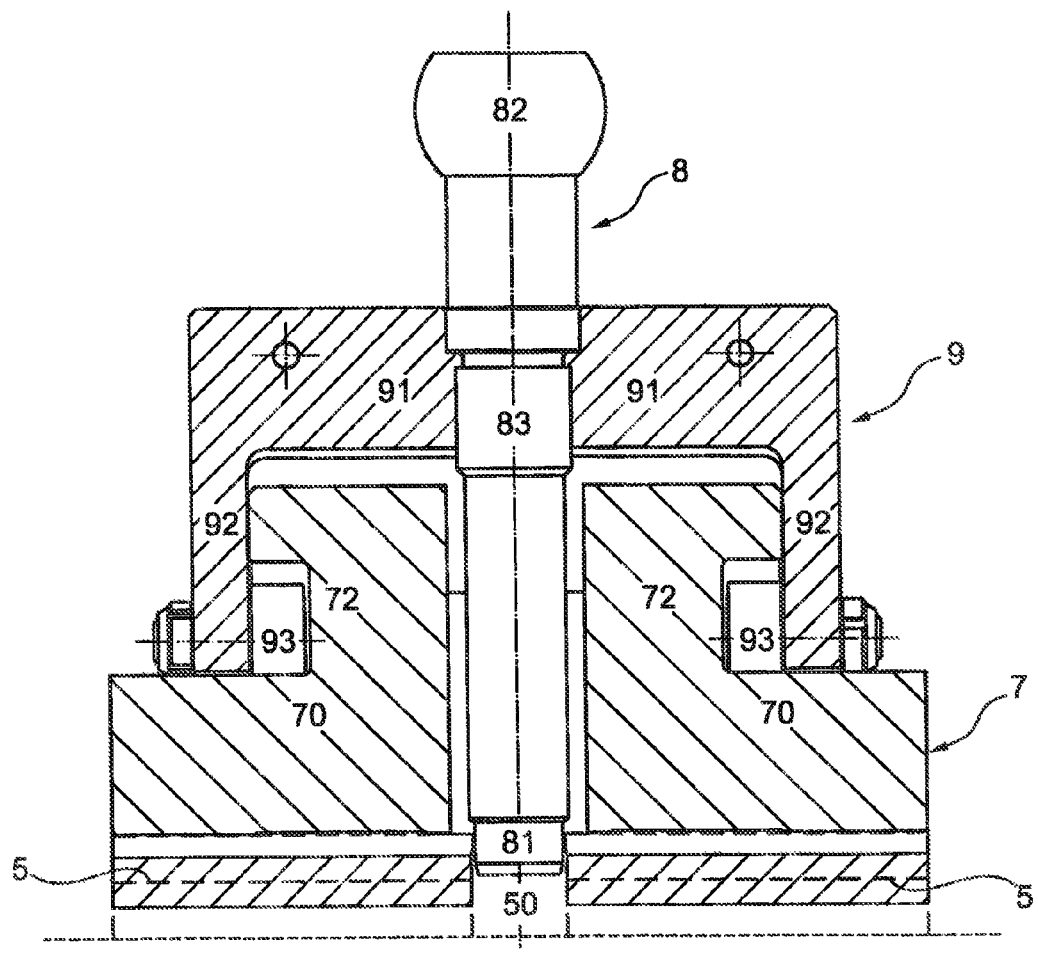
FIG. 22 shows a cross-section of a device for acting on and rotating the bushing shells of a split bearing comprised in the bearing assembly of FIG. 20 and FIG. 21.

Detailed description follows with reference to FIG. 20, FIG. 21 and FIG. 22.

Figure 4:
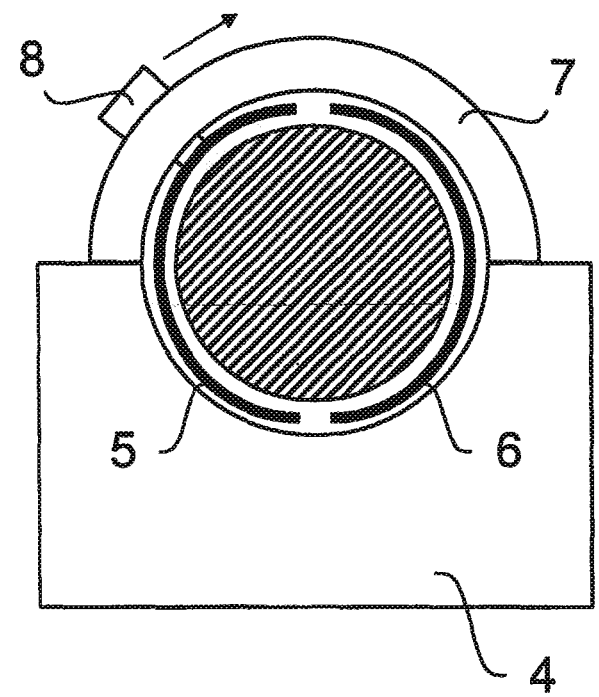

In FIG. 20, the upper housing part 3 of the bearing assembly has been dismounted from the lower housing part 4 and the maintenance tool (see FIG. 21 for a better view) has been mounted to the lower housing part 4 by means of four screws 11; it is apparent that FIG. 04 may be considered a schematic representation of FIG. 20.

The device essentially consists of a slide 9 and a pin 8.

The slide 9 has a hole transversal to its sliding direction (see FIG. 22).

The pin 8 is slidably mounted inside the transversal hole and protrudes from the hole on both sides of the slide 9; in a first operating position (see FIG. 22) the pin 8 acts on a shell (the shell 5 in FIG. 22) as a first end 81 of its two ends is inserted in a first hole 50 of the lubricating holes of the shell; in a second operating position (not shown in the figures) the pin 8 does not act on the shells as it is retracted (for example inside the tool housing 7) and the first end 81 is distant from any of the lubricating holes of the shells. The pin 8 has an intermediate shank comprising a threaded portion 83 adapted to cooperate with the a corresponding threaded portion of the transversal hole of the slide 9; by screwing and unscrewing (for example manually), the pin 8 slid back and forth along a short stroke and can be inserted into and extracted from a lubrication hole of a bushing shell; screwing and unscrewing is carried out by means of a second end 82 of the pin 8.

In the embodiment of FIG. 20 and FIG. 21 and FIG. 22, the slide of the device of the maintenance tool is indeed a carriage 9 comprising a body 91, two legs 92 protruding from the body 91, and four wheels 93 rotatably mounted on the two legs 92; the hole for the pint 8 is provided in the body 91. In the embodiment if FIG. 22, the legs 92 are flat a protrudes transversely from the body 91; the wheels 93 are located on the internal sides of the legs 92; in this way, a C-shaped cross-section element is realized (see FIG. 22).

In the embodiment of FIG. 20 and FIG. 21 and FIG. 22, the slide 91 cooperates with a guide 72 (to be precise a double guide) integrated into the tool housing 7 and protruding from a body 70 of the housing 7 on its external side; the guide 72 has a T-shaped cross-section matching with the C-shaped cross-section of the above mentioned element. The guide 72 is arc-shaped and the slide 9 is arranged to slide back and forth along the guide 72 by acting (for example manually) on the second end 82 of the pint 8; the stroke of this translation-rotation movement is for example 110° even if the useful (in view of the desired rotation of the bushing shells) stroke is for example 90°. In order to allow this translation-rotation movement of the combination of the slide 9 and the pin 8, the tool housing has a slot 71 for receiving the shank of the pin 8 during its movement; the slot 71 cuts both the body 70 and the guide 72.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A maintenance tool for a bearing assembly, wherein the bearing assembly comprises a bushing split into at least two shells, the maintenance tool comprising:
 a device configured to act on and rotate a shell of said at least two shells, wherein said device comprises a slide and a pin;
 a tool housing releasably fixable to the bearing assembly, wherein said tool housing comprises a guide, and wherein said guide comprises a slot which allows a translation-rotation movement of a combination of said slide and said pin along said guide.

2. The maintenance tool of claim 1, wherein said slide comprises a hole transversal to sliding direction of said slide, wherein said pin is slidably mounted inside said hole and protrudes from said hole, whereby in a first operating position said pin acts on said shell, and in a second operating position said pin does not act on said shell.

3. The maintenance tool of claim 2, wherein said bearing assembly further comprises a bearing housing split into a first housing part and a second housing part, wherein said first housing part and said second housing part are releasably fixable together, and wherein said tool housing is releasably fixable to said second housing part of said bearing assembly.

4. The maintenance tool of claim 3, wherein said guide being arc-shaped, and wherein said slide is arranged to slide back and forth along said guide.

5. The maintenance tool of claim 2, wherein said guide is arc-shaped, and wherein said slide is arranged to slide back and forth along said guide.

6. The maintenance tool of claim 1, wherein said bearing assembly further comprises a bearing housing split into a first housing part and a second housing part, wherein said first housing part and said second housing part are releasably fixable together, and wherein said tool housing is releasably fixable to said second housing part of said bearing assembly.

7. The maintenance tool of claim 1, wherein said guide being arc-shaped, and wherein said slide is arranged to slide back and forth along said guide.

8. A machine, comprising:
 a rotatable shaft supported by at least two bearing assemblies; and
 said maintenance tool according to claim 1 for at least one of said at least two bearing assemblies, wherein said at least one bearing assembly comprises a bushing split into at least two shells.

9. The maintenance tool of claim 1, wherein said bearing assembly is provided with an opening having a size equal to or greater than any one of said at least two shells.

10. The maintenance tool of claim 9, wherein said at least two shells are rotated until one of said at least two shells is in a position corresponding to said opening, to allow extraction of said one of said at least two shells from said bearing assembly.

11. The maintenance tool of claim 10, wherein said rotation of one of said at least two shells causes rotation of the other of said at least two shells when edges of each of said at least two shells are in contact.

12. The maintenance tool of claim 10, wherein said extraction of said one of said at least two shells from said bearing assembly is obtained by a radial displacement of said one of said at least two shells when said one of said at least two shells is aligned with said opening.

13. A machine, comprising:
 a rotatable shaft supported by at least two bearing assemblies,
 a maintenance tool for at least one of said at least two bearing assemblies, wherein said at least one bearing assembly comprises a bushing split into at least two shells, and wherein said maintenance tool comprises a device arranged to act on and rotate a shell of said at least two shells, wherein said device comprises a slide and a pin, and
 a tool housing releasably fixable to said at least one bearing assembly, wherein said tool housing comprises a guide, and wherein said guide comprises a slot which allows a translation-rotation movement of a combination of said slide and said pin along said guide.

14. The machine of claim 13, wherein said pin is configured to radially slide and rotate about an axis of said rotatable shaft.

15. The machine of claim 13, wherein said guide is arc-shaped, and wherein said slide is arranged to slide back and forth along said guide.

* * * * *